United States Patent
Okanoue et al.

[19]
[11] Patent Number: 5,925,137
[45] Date of Patent: Jul. 20, 1999

[54] ALTERNATE ROUTING OF MANAGEMENT MESSAGE TO SIMPLIFIED NETWORK ELEMENT IN A RING NETWORK

[75] Inventors: Yasuyo Okanoue, Tokyo; Yoshihiko Taki, Kanagawa, both of Japan

[73] Assignee: NEC Corporation, Tokyo, Japan

[21] Appl. No.: 08/826,121

[22] Filed: Mar. 27, 1997

[30] Foreign Application Priority Data

Mar. 28, 1996 [JP] Japan .................................. 8-073514

[51] Int. Cl.$^6$ .................................................. G06F 11/00
[52] U.S. Cl. .............................. 714/4; 714/43; 709/239
[58] Field of Search ..................... 395/182.02, 182.09, 395/183.19, 183.13, 200.68, 200.69, 200.71, 200.72, 200.73; 370/222, 223, 226, 227, 228

[56] References Cited

U.S. PATENT DOCUMENTS

| | | | |
|---|---|---|---|
| 4,190,821 | 2/1980 | Woodward | 395/182.02 |
| 4,538,264 | 8/1985 | Bahr et al. | 395/182.02 |
| 5,003,531 | 3/1991 | Farinholt et al. | 395/182.02 |
| 5,034,945 | 7/1991 | Kimoto et al. | 370/13.1 |
| 5,065,399 | 11/1991 | Hasegawa et al. | 395/182.02 |
| 5,093,824 | 3/1992 | Coan et al. | 395/182.02 |
| 5,159,595 | 10/1992 | Flanagan | 395/182.02 |
| 5,173,689 | 12/1992 | Kusano | 395/182.02 |
| 5,218,601 | 6/1993 | Chujo et al. | 395/182.02 |
| 5,239,537 | 8/1993 | Sakauchi | 370/16 |
| 5,463,615 | 10/1995 | Steinhorn | 395/182.02 |
| 5,506,838 | 4/1996 | Flanagan | 370/54 |
| 5,581,543 | 12/1996 | Natarajan | 395/182.02 |
| 5,623,482 | 4/1997 | Okanoue | 395/182.02 |
| 5,684,807 | 11/1997 | Bianchini, Jr. et al. | 395/182.02 |

FOREIGN PATENT DOCUMENTS

| | | | |
|---|---|---|---|
| 7-264184 | 10/1995 | Japan | H04L 12/24 |

*Primary Examiner*—Joseph E. Palys
*Attorney, Agent, or Firm*—Sughrue, Mion, Zinn, Macpeak & Seas, PLLC

[57] ABSTRACT

In a ring network, a network element having no routing protocol is connected between first and second nodes, and the first node has a link status table indicating link states of the network element and the second node. The first node transmits a health check polling message at periodic intervals to the network element as well as to the second node to elicit responses therefrom, updates each of the link states when no response is returned, examines the link status table at periodic intervals, and broadcasts a message to the network for updating a routing table of a third node of the network so that an alternate route is established from the third node to the network element via the first node if the link status table indicates that there is a faulty condition between the network element and the second node. The third node transmits a network management message to the network element via the alternate route according to the updated routing table.

10 Claims, 2 Drawing Sheets

5,925,137

ALTERNATE ROUTING OF MANAGEMENT MESSAGE TO SIMPLIFIED NETWORK ELEMENT IN A RING NETWORK

BACKGROUND OF THE INVENTION

1. Field of the Invention

The present invention relates to a packet-switched communication network wherein nodes having routing protocols and at least one network element (such as line repeater) having no routing protocols are interconnected in a ring configuration, and more specifically to alternate routing of management messages during network failure.

2. Description of the Related Art

Routing of management messages and alternate routing of traffic during a link failure in a ring network are currently implemented with the TCO/IP protocols installed in each node of the network. In a network where a simplified network element having no protocols is provided between two adjacent nodes, the address of each of these nodes is used for routing a management message to the network element. However, when the link between the network element and one of these adjacent nodes fails, they have no ability for routing the management message to the network element even though an alternate route is available.

Japanese Laid-Open Patent Specification Hei-7-264184 discloses a method for routing network traffic during link failure by broadcasting hunting messages through the network to search for an alternate route. However, since this method is implemented with an algorithm at the application level, the prior art has low reliability and takes long to recover from the link failure.

SUMMARY OF THE INVENTION

It is therefore an object of the present invention to provide alternate routing of a management message to a network element having no routing function when a failure occurs in one of the links to the network element.

According to the present invention, there is provided a communication network comprising a plurality of nodes having a routing function for routing a message through the network and a network element having no routing function, all the nodes and the network clement being interconnected by transmission links in a ring network configuration, the network element being located between first and second nodes of the network. The first node monitors link states of the network element and the second node and broadcasts a message to the network for updating a routing table of a third node so that an alternate route is established from the third node to the network clement via the first node if a faulty condition is detected between the network element and the second node. The third node transmits a network management message to the network element according to the updated routing table.

Specifically, the first node includes a link status table indicating link states of the network element and the second node and transmits a health check polling message at periodic intervals to the network element as well as to the second node to elicit responses therefrom. The first node updates each of the link states when no response is returned, examines the link status table at periodic intervals, and broadcasts a message to the network for updating a routing table of the third node so that an alternate route is established from the third node to the network element via the first node if the link status table indicates that there is a faulty condition between the network element and the second node.

BRIEF DESCRIPTION OF THE DRAWING

The present invention will be described in further detail with reference to the accompanying drawings, in which.

DETAILED DESCRIPTION

Figure 1:
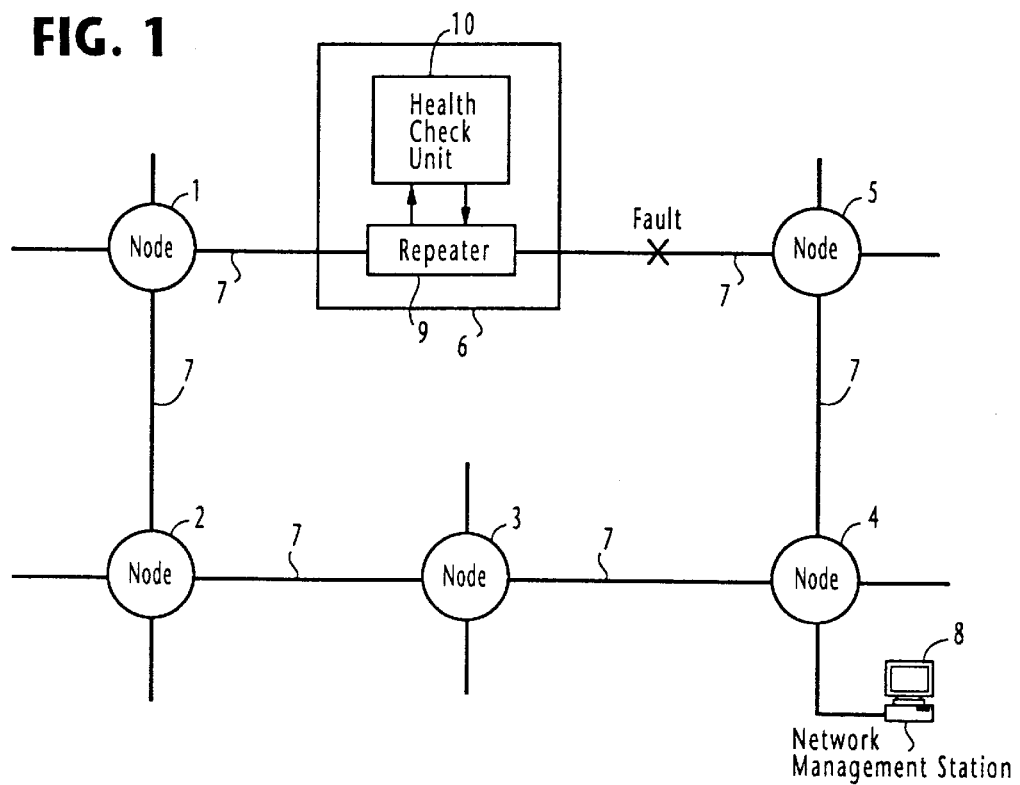
FIG. 1 is a block diagram of a communication network according to the present invention.

In FIG. 1, there is shown a typical communications network in which a plurality of nodes 1, 2, 3, 4 and 5 and a simplified network element 6 are interconnected by transmission links 7 in a ring network configuration. A network management station 8 is connected to one of the nodes, such as node 4, The simplified network element (SNE) may be comprised by a line repeater 9 and a health check unit 10. The line repeater is connected to the transmission line to provide retiming and retransmission of received pulses restored to their original strength. The health check unit 10 is connected to the repeater 9 to receive a health check polling message at periodic intervals from adjacent nodes 1 and 5 and returns a response indicating that the link to the repeater from each node is properly functioning (i.e., active).

Figure 2:
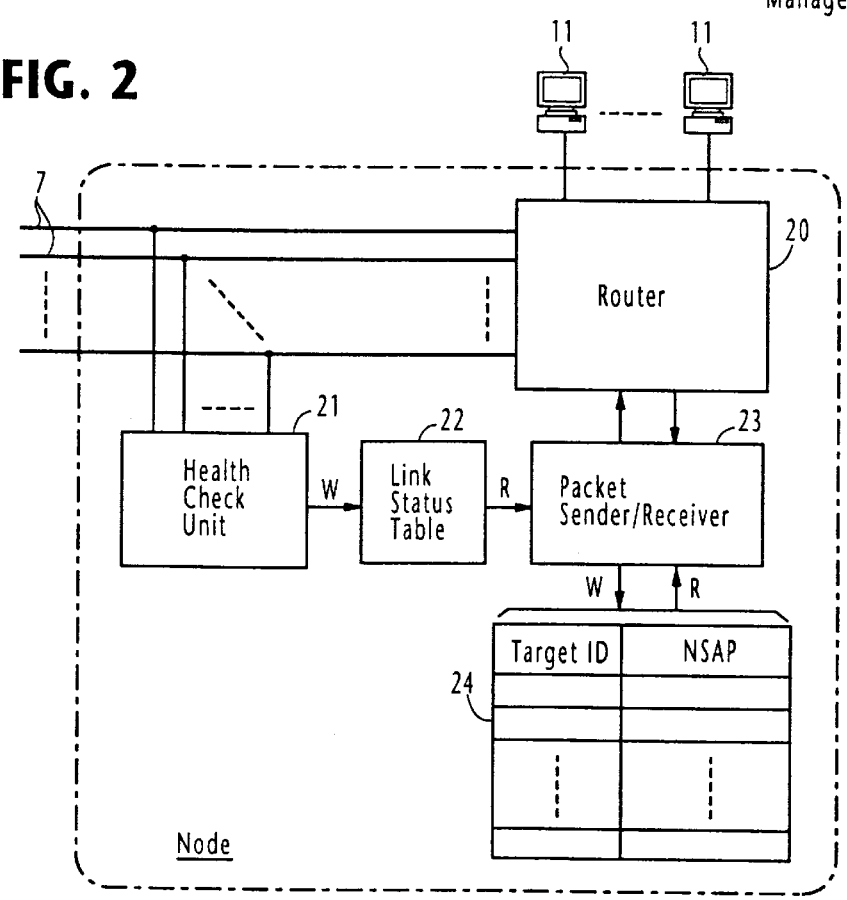
FIG. 2 is a block diagram of each of the network nodes of FIG. 1.

As illustrated in FIG. 2, each network node comprises a router 20 for receiving packets from and forwarding them to transmission links 7 according to the RIP (Routing Information Protocol) and IS-IS/ES-IS (Intermediate System-Intermediate System/End System-Intermediate System) at the OSI (Open Systems Interconnection) level of TCP/IP (Transmission Control Protocol/Internet Protocol). Additionally, a plurality of user data terminals 11 may also be connected to the router 20. A health check unit 21 of each node is connected to the transmission links for transmitting a health check polling message at periodic intervals to adjacent nodes and returning a response when it receives a health check polling message from adjacent nodes, indicating that the link to the node is "active". A link status table 22 is connected to the health check unit 21 to store a record of health check responses from adjacent nodes and update the record if no response is returned. If the node is adjacent to the simplified network element 6, the administers it by creating a record of the status of its link to the SNE in the link status table 22.

A packet sender/receiver 23 is provided for reading the contents of link status table 22 at periodic intervals. As will be described later, if there is a change in the status of an adjacent node or SNE, the packet sender/receiver 23 of each node produces a TARP (target address resolution protocol) type-4 broadcast packet containing a target identifier (TID) of the target device (node or SNE) and the NSAP (network service access point) address of the node and supplies the packet to the router 20. The router 20 forwards the broadcast packet to all the transmission links terminating to the node, so that it is propagated to all the other nodes of the network. On receiving a TARP type-4 packet, the router 20 of each node passes it to the packet sender/receiver 23 where the packet is used to update a routing table, or TARP data cache 24. Data cache 24 defines a map indicating the relationships between a plurality of TIDs and corresponding NSAPs. Therefore, if the access route from node 4 to SNE 6 is via the node 5, the TID of SNE 6 is mapped to the NSAP of node 5 in the data cache 24. A TARP type-4 packet is also produced and broadcast from nodes 1 and 5 when these nodes alter the TID of SNE 6.

The network management station 8 transmits a management message to node 4 when accessing SNE 6. On receiving this management message, the packet sender/receiver 23 of the node accesses the TARP data cache 24 to search for a target identifier. If the management message is destined for SNE 6, the packet sender/receiver 23 finds the NSAP of node 5 in the TID entry of the destination and rewrites the destination node address of the management message with the NSAP of node 5 and forwards it to the network.

Figure 3:
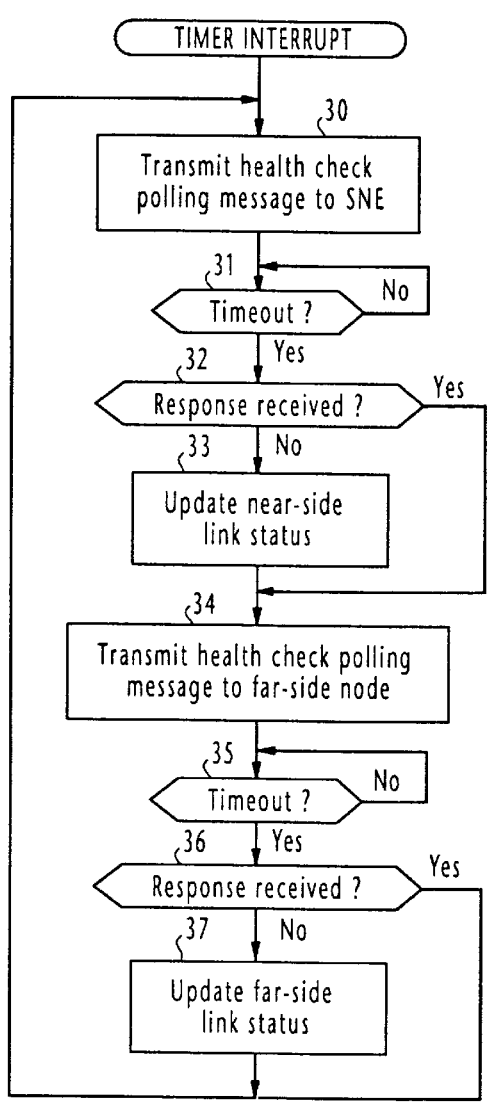
FIG. 3 is a flowchart illustrating the operation of the health check unit of each network node.
Figure 4:
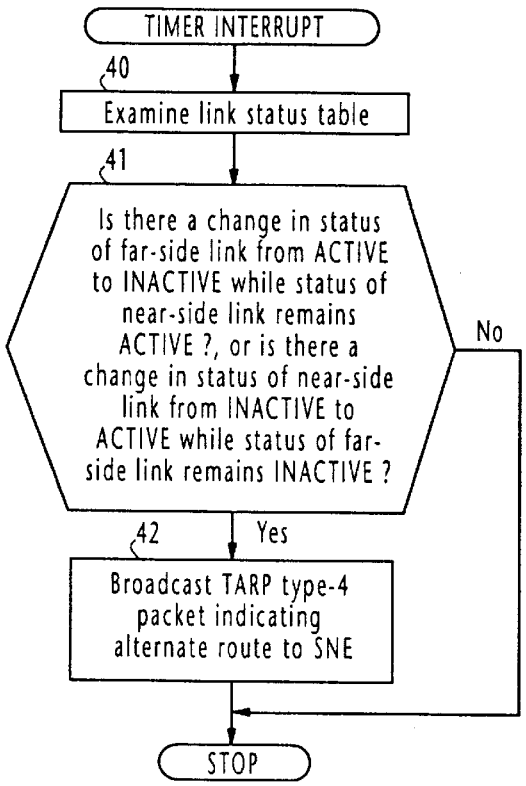
FIG. 4 is a flowchart illustrating the operation of the packet sender/receiver of a network node which administers a simplified network element (SNE)
Figure 5:
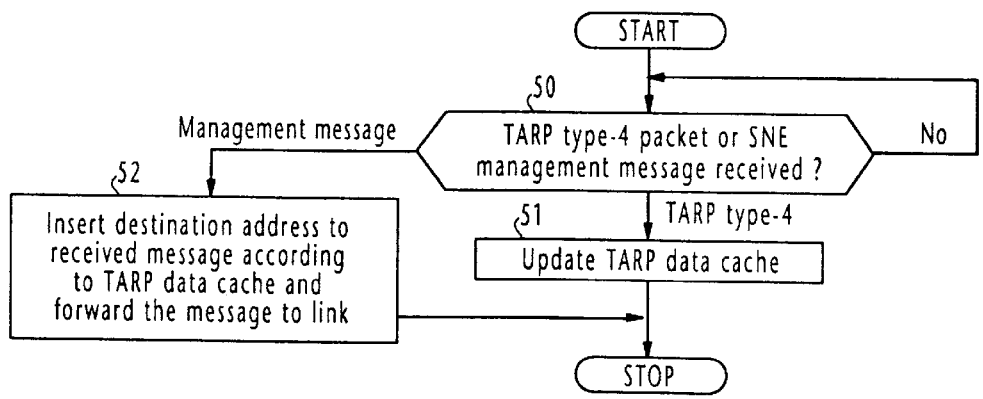
FIG. 5 is a flowchart illustrating the operation of the packet sender/receiver of a network node to which transmits a network management message to the simplified network element.

The operation of nodes 1 and 5 will be better understood with the following description with reference to the flowcharts of FIGS. 3 to 5 by assuming that the access route from node 4 to SNE 6 is initially via node 5.

In FIG. 3, the health check unit 21 of nodes 1 and 5 runs a timer interrupt routine at periodic intervals, starting with step 30 in which it transmits a health check polling message to SNE 6. Flow proceeds to step 31 to determine whether a timeout period has expired. If so, the health check unit 21 determines whether a response from SNE 6 is received (step 32). If no response is returned within the timeout period, it is determined that a faulty condition has occurred in the link on the near-side of SNE 6 and flow proceeds from step 32 to step 33 to update the link status table 22 so that the status of the near-side link is changed from ACTIVE to INACTIVE. If a response is received within the timeout period or step 33 is executed, flow proceeds to step 34 to transmit a health check polling message to the node on the far-side of SNE 6 and proceeds to step 35 to determine whether a timeout period has expired. If so, flow proceeds to step 36 to determine whether a response from the far-side node is received. If no response is received within the timeout period, it is determined that a failure has occurred in the link between SNE 6 and the far-side node and flow proceeds from step 36 to step 37 to update the link status table 22 so that the status of the far-side link is changed from ACTIVE to INACTIVE. If a response is received within the timeout period (step 36) or step 37 is executed, flow proceeds to the end of the health check timer interrupt routine.

FIG. 4, the packet sender/receiver 23 of nodes 1 and 5 runs a timer interrupt routine at periodic intervals to read the status of SNE 6 from the link status table 22 (step 40). At step 41, health check unit 21 of each of the nodes 1 and 5 determines whether there is a change in the status of the far-side link from ACTIVE to INACTIVE while the near-side link remains ACTIVE, or whether there is a change in the near-side link from INACTIVE to ACTIVE while the far-side link status remains INACTIVE. If the decision at step 41 is affirmative, flow proceeds to step 42 to broadcast a TARP type-4 packet to the network indicating an alternate route to SNE 6. If the decision at step 41 is negative, flow proceeds to the end of the timer interrupt routine.

In FIG. 5, when node 4 receives a packet from the network, the packet sender/receiver 23 of the node determines whether it is a TARP type-4 broadcast packet or a network management message (step 50). If, the received packet is a TARP type-4 packet, flow proceeds from step 50 to step 51 to update the TARP data cache 24 according to the received packet. If the received packet is a network management message, node 4 proceeds from step 50 to step 52 to insert a destination address to the received message according to the contents of the TARP data cache and transmits the management message to the network.

If a faulty condition should occur in the transmission link between SNE 6 and node 5 as marked by a symbol X in FIG. 1, the health check unit 21 of node 1 yields an affirmative decision at step 41 and proceeds to step 42 to produce a TARP type-4 packet containing the TID of SNE 6 and the NSAP of node 1 so that it indicates an alternate route to the SNE. Then, the health check unit of node 1 broadcasts the TARP type-4 packet through the network. This packet is propagated through nodes 2 and 3 and received by node 4 to update its TARP data cache 24 so that the TID entry of SNE 6 in data cache 24 is changed from the NSAP of node 5 to the NSAP of node 1. When node 4 receives a network management message destined for SNE 6 from the network management station 8, the NSAP address of node 1 is inserted to the management message as its destination address and the message is forwarded to node 3. Therefore, the network management message is routed via nodes 3, 2 and 1 to SNE 6. It is seen that if the link between node 1 and SNE 6 should fail, the node 5 broadcasts a message to the network for updating the data cache 24 of node 4 so that an alternate route is established from node 4 to the SNE 6 via node 5.

What is claimed is:

1. A communication network comprising:
   a plurality of nodes having a routing function for routing a message through the network and a network element having no routing function, said nodes and said network element being interconnected by transmission links in a ring network configuration, said network element being located between first and second nodes of the network,
   said first node monitoring link states of said network element and said second node and broadcasting a message to the network for updating a routing table of a third node of the network so that an alternate route is established from said third node to said network element via the first node if a faulty condition is detected between said network element and said second node,
   said third node transmitting a network management message to said network element according to the updated routing table.

2. A communication network as claimed in claim 1, wherein said second node monitoring link states of said network element and said first node and broadcasting a message to the network for updating the routing table of said third node so that an alternate route is established from said third node to said network element via the second node if a faulty condition is detected between said network element and said first node.

3. A communication network comprising:
   a plurality of nodes and a network element interconnected by transmission links in a ring network configuration, each of said nodes having a routing function for routing a message through the network and said network element having no routing function, said network element being located between first and second nodes of the network, said first node having a link status table indicating link states of said network element and said second node,
   said first node transmitting a health check polling message at periodic intervals to said network element and said second node to elicit responses therefrom, updating each of said link states when no response is returned, examining the link status table at periodic intervals, and broadcasting a message to the network for updating a routing table of a third node of the network so that an alternate route is established from the third node to said network element via said first node if the link status table indicates that there is a faulty condition between said network element and said second node, said third node transmitting a network management message to said network element via said alternate route according to the updated routing table.

4. A communication network as claimed in claim 3, wherein said second node includes a link status table indicating link states of said network element and said first node, said second node transmitting a health check polling message at periodic intervals to said network element and said first node to elicit responses therefrom, updating each of the link states when no response is returned, examining the link status table at periodic intervals, and broadcasting a message to the network for updating the routing table of the third node so that an alternate route is established from the third node to said network element via said second node if the link status table indicates that there is a faulty condition between said network element and said first node.

5. A communication network as claimed in claim 3, wherein said broadcast message contains an identifier identifying said network element and a network address identifying said first node, and wherein the routing table of said third node is arranged to store said identifier and said network address.

6. A communication network as claimed in claim 4, wherein said message broadcast from the second node contains an identifier identifying said network element and a network address identifying said second node, and wherein the routing table of said third node is arranged to store said identifier and said network address.

7. An alternate routing method for a communication network formed by a plurality of nodes having a routing function for routing a message through the network and a network element having no routing function, said nodes and said network element being interconnected by transmission links in a ring network configuration, said network element being located between first and second nodes of the network, the method comprising the steps of:

monitoring, at said first node, link states of said network element and said second node;

if a faulty condition is detected between said network element and said second node, broadcasting a packet from said first node to said network for updating a routing table of a third node of the network so that an alternate route is established from the third node to said network element via the first node; and transmitting a network management message from said third node to said network element according to the updated routing table.

8. An alternate routing method as claimed in claim 7, further comprising the steps of:

monitoring, at said second node, link states of said network element and said first node; and if a faulty condition is detected between said network element and said first node, broadcasting a packet from said second node to said network for updating the routing table of the third node so that an alternate route is established from the third node to said network element via the second node.

9. An alternate routing method for a communication network formed by a plurality of nodes having a routing function for routing a message through the network and a network element having no routing function, said nodes and said network element being interconnected by transmission links in a ring network configuration, said network element being located between first and second nodes of the network, said first node having a link status table indicating link states of said network element and said second node, the method comprising the steps of:

transmitting from said first node a health check polling message at periodic intervals to said network element and said second node to elicit responses therefrom;

updating each of the link states of said network element and said second nodes when no response is returned;

examining the link status table at periodic intervals;

if the link status table indicates that there is a faulty condition between said network element and said second node, broadcasting a message to the network from the first node for updating a routing table of a third node of the network so that an alternate route is established from the third node to said network element via said first node; and transmitting a network management message from said third node to said network element via said alternate route according to the updated routing table.

10. An alternate routing method as claimed in claim 9, wherein said second node includes a link status table indicating link states of said network element and said first node, further comprising the steps of:

transmitting from said second node a health check polling message at periodic intervals to said network element and said first node to elicit responses therefrom;

updating each of the link states of the network element and said first node when no response is returned;

examining the link status table of the second node at periodic intervals; and if the link status table of the second node indicates that there is a faulty condition between said network element and said first node, broadcasting a message to the network for updating the routing table of the third node so that an alternate route is established from the third node to said network element via said second node.

* * * * *

UNITED STATES PATENT AND TRADEMARK OFFICE
CERTIFICATE OF CORRECTION

PATENT NO. : 5,925,137
DATED : July 20, 1999
INVENTOR(S) : Yasuyo OKANOUE et al.

It is certified that error appears in the above-identified patent and that said Letters Patent is hereby corrected as shown below:

Col. 2, line 27, after "repeater" insert --9--.

Signed and Sealed this

Fifteenth Day of February, 2000

*Attest:*

Q. TODD DICKINSON

*Attesting Officer*  *Commissioner of Patents and Trademarks*